(12) United States Patent
Makino et al.

(10) Patent No.: US 6,196,531 B1
(45) Date of Patent: Mar. 6, 2001

(54) COMPRESSION SPRING FORMED OF AN ELASTIC BODY

(75) Inventors: Hiroki Makino; Tsutomu Tomizawa, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/253,005

(22) Filed: Feb. 19, 1999

(30) Foreign Application Priority Data

Feb. 19, 1998 (JP) .................................................. 10-036910

(51) Int. Cl.$^7$ ..................................................... B60G 11/22
(52) U.S. Cl. ......................... 267/292; 267/141; 267/153; 267/257
(58) Field of Search ................................... 267/141, 153, 267/292, 257

(56) References Cited

U.S. PATENT DOCUMENTS

| | | | |
|---|---|---|---|
| 3,955,808 | * | 5/1976 | Jorn et al. ............................. 267/152 |
| 4,098,498 | * | 7/1978 | Da Silva ............................... 267/287 |
| 4,601,413 | * | 7/1986 | Krawagna ............................. 267/159 |
| 5,102,107 | * | 4/1992 | Simon et al. ......................... 267/152 |
| 5,280,890 | * | 1/1994 | Wydra .................................. 267/220 |
| 5,435,532 | * | 7/1995 | Ihle et al. ............................. 267/153 |
| 5,588,165 | * | 12/1996 | Fromme ................................ 267/141 |

FOREIGN PATENT DOCUMENTS 7-502698   3/1995 (JP) .

* cited by examiner

*Primary Examiner*—Robert J. Oberleitner
*Assistant Examiner*—Devon Kramer
(74) *Attorney, Agent, or Firm*—Birch, Stewart, Kolasch & Birch, LLP

(57) ABSTRACT

To provide a compression spring formed of an elastic body made from a resin or rubber which is capable of maintaining its shape upon deformation without the use of any supporting member, thereby always ensuring a specific load-deformation characteristic. A compression spring of the present invention includes a cylindrical spring main body, wherein compression energy generated when the compression spring is pressed in the radial direction is absorbed by elastic deformation of the cylindrical spring main body. In this compression spring, a base having a flat bottom surface swelled along a plane perpendicular to the pressing direction is formed on the pressing force receiving side of the spring main body. Furthermore, a reinforcing wall for connecting the swelled portion of the base to a side portion of the cylindrical spring main body is formed integrally with the spring main body.

19 Claims, 7 Drawing Sheets

"CONVENTIONAL ART"

COMPRESSION SPRING FORMED OF AN ELASTIC BODY

BACKGROUND OF THE INVENTION

1. Field of the Invention

The present invention relates to a compression spring formed of an elastic body made from a resin or rubber.

2. Description of Related Art

Compression springs of this type are known. One type of known compression spring includes an elastic body formed into a cylindrical shape, wherein a compression energy generated when the compression spring is pressed in the radial direction is absorbed by elastic deformation of the elastic body in the direction the elastic body is flattened.

For example, a compression spring shown in FIG. 9 of the present invention is disclosed in Japanese Patent (PCT international application) Laid-open No. Hei 7-502698, wherein a cylindrical main body comprises two cylindrical elastic bodies 01 and 02 stacked in the radial direction. A connecting portion 03 is formed into a neck-shape between the two cylindrical elastic bodies. Furthermore, a flat top plate 04 and a flat bottom plate 05 are provided on the two cylindrical bodies 01 and 02, respectively.

The top plate 04, the bottom plate 05 and the connecting portion 03 respectively have circular holes 04a, 05a and 03a through which a bolt co-axially passes.

Compression energy generated when the compression spring is pressed in the radial direction is absorbed by elastic deformation of the cylindrical elastic bodies 01 and 02 in the direction the elastic bodies 01 and 02 are flattened.

The above compression spring is used in a state in which a bolt passes through the circular holes 04a, 05a and 03a respectively formed in the top plate 04, bottom plate 05 and connecting portion 03 for stabilizing the shape of the compression spring when the compression spring is deformed. In other words, if the compressing spring is not supported by the above bolt, the cylindrical main body may be bent at the necked connecting portion 03, resulting in it being difficult to ensure a specific load-deformation characteristic of the compression spring because of instability of the shape upon deformation.

In this way, the related art compression spring cannot stably absorb a compression energy unless it is supported by a supporting member such as a bolt. The related art compression spring which requires such a supporting member limits the versatility of the compression spring.

SUMMARY OF THE INVENTION

In view of the foregoing, the present invention has been made, and an object of the present invention is to provide a compression spring made of an elastic body which is capable of having a stabilized shape upon deformation without the use of any supporting member. A specific load-deformation characteristic of the compression spring of the present invention is therefore ensured.

To achieve the above object, according to a first aspect of the present invention, there is provided a compression spring made of an elastic body comprising a cylindrical spring main body, wherein compression energy generated when the compression spring is pressed in the radial direction is absorbed by elastic deformation of the cylindrical spring main body. In the compression spring of the present invention, a base which has a flat bottom surface swelled along a plane perpendicular to the pressing direction is formed on the pressing force receiving side of the spring main body. Furthermore; a reinforcing wall for connecting the swelled portion of the base to a side portion of the cylindrical spring main body is formed integrally with the spring main body.

Since the swelled portion of the base is connected to a side portion of the cylindrical spring main body by means of the reinforcing wall so as to reinforce the connecting portion between the spring main body and the base, when the compression spring is pressed in the radial direction, the connecting portion between the spring main body and the base is prevented from being bent in one direction without requiring any supporting member. This prevents the spring main body from being tilted to an unbalanced state, thereby stabilizing the shape of the compression spring upon deformation and ensuring a specific load-deformation characteristic. The compression spring of the present invention, which does not require any supporting member, can be used for an increased number of applications and is therefore very versatile.

According to a second aspect of the present invention, there is provided a compression spring made of an elastic body comprising a cylindrical spring main body, wherein compression energy generated when the compression spring is pressed in the radial direction is absorbed by elastic deformation of the cylindrical spring main body. The compression spring includes the spring main body being formed of a plurality of cylindrical elastic bodies stacked in the radial direction. Furthermore; one or more reinforcing walls for connecting adjacent side portions of the plurality of cylindrical elastic bodies to each other are formed integrally with the spring main body.

Since the spring main body is formed of a plurality of cylindrical elastic bodies stacked in the radial direction, and each connecting portion between adjacent cylindrical elastic bodies is reinforced by connecting the side portions of the adjacent cylindrical elastic bodies by means of the reinforcing wall, when the compression spring is pressed in a radial direction, the connecting portion between the adjacent cylindrical elastic bodies is prevented from being bent in one direction without requiring any supporting member. This prevents the spring main body from being tilted to an unbalanced state, thereby stabilizing the shape of the compression spring upon deformation and ensuring a specific load-deformation characteristic. The compression spring of the present invention, which does not require any supporting member, can be used for an increased number of applications and is therefore very versatile.

According to a third aspect of the present invention, there is provided a compression spring made of an elastic body comprising a cylindrical spring main body, wherein compression energy generated when the compression spring is pressed in the radial direction is absorbed by elastic deformation of the cylindrical spring main body. The compression spring of the present invention includes a base, which has a flat bottom surface swelled along a plane perpendicular to the pressing direction, formed on the pressing force receiving side of the spring main body. The base forms a part of the cylindrical spring main body since a flat upper surface thereof partially intersects a circular hollow of the cylindrical portion of the cylindrical spring main body.

Since the base forms a part of the cylindrical spring main body in the state where the flat upper surface thereof partially intersects a circular hollow of the cylindrical portion of the cylindrical spring main body, both side portions of the spring main body, serving as leg portions, are connected to the flat plate like base. Therefore, when the compression spring is pressed in the radial direction, the spring main body is prevented from being tilted in an unbalanced state without requiring any supporting member, thereby stabilizing the shape of the compression spring main body upon deformation and ensuring a specific load-deformation characteristic. The compression spring of the present invention, which does not require any supporting member, can be used for an increased number of applications and is therefore very versatile.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
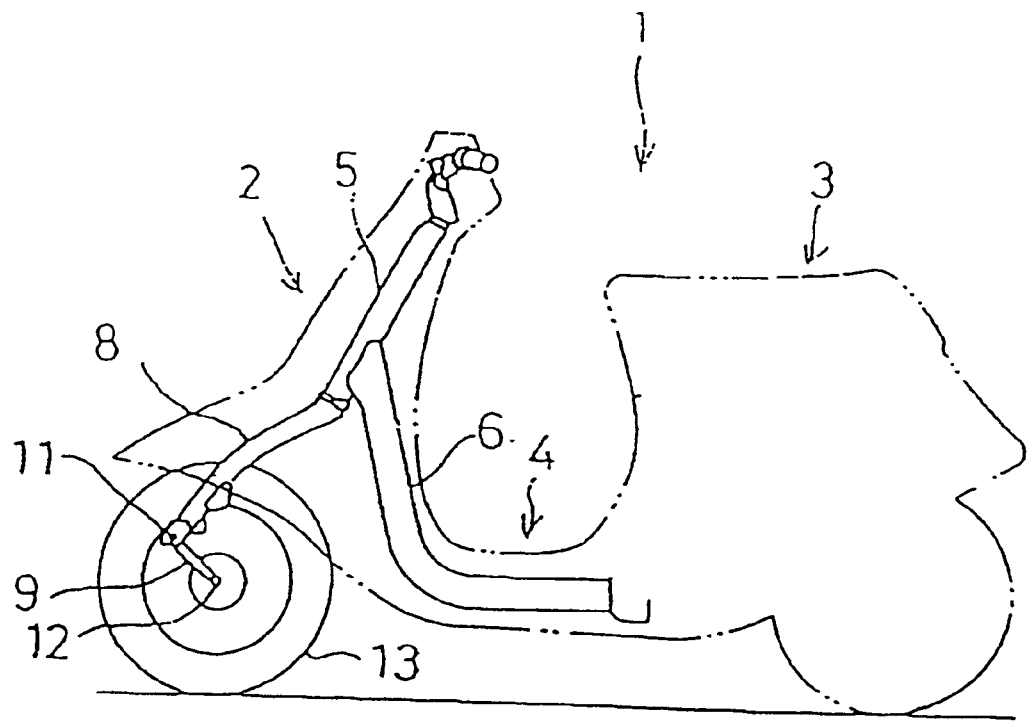
FIG. 1 is a side view, with components partly omitted, showing a scooter-type motorcycle to which a damping force generating mechanism according to one embodiment of the present invention is applied to a wheel suspension.

The present invention will now be described with reference to the accompanying drawings. Referring to FIGS. 1–7, one embodiment of the present invention will be explained. FIG. 1 is a side view, with components partly omitted, of a scooter type motorcycle 1 in which a damping force generating mechanism is applied to a wheel suspension.

A low floor 4 is formed between a front body 2 and a rear body 3. A down frame 6 extends downward from a head pipe 5 mounted to the front body 2. The down frame 6 is bent at its lower end, extending rearwardly. The rear portion of the down frame 6 constitutes a main part of the floor 4.

Figure 2:
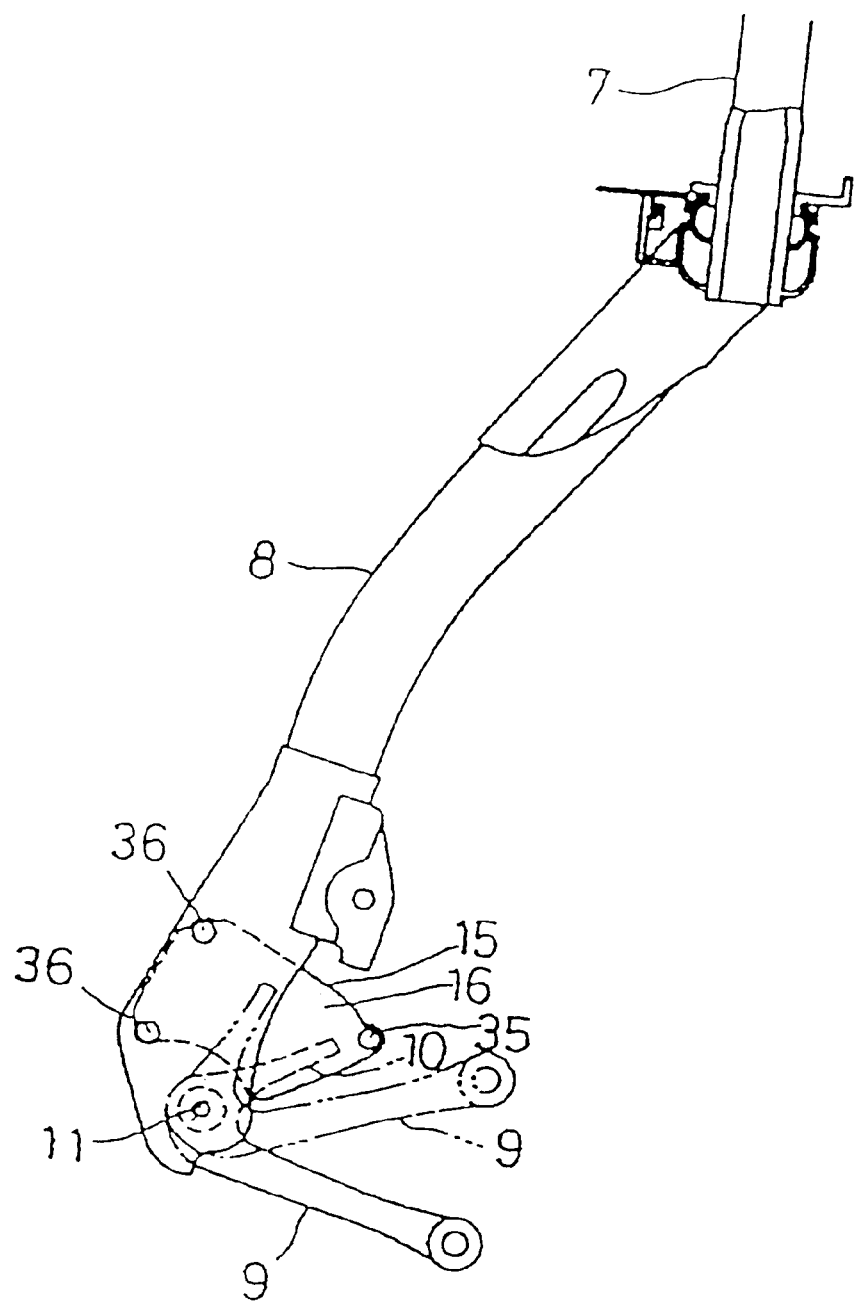
FIG. 2 is a side view showing a front forked portion and adjacent parts.

Referring to FIG. 2, steering shaft 7 is turnably fitted in the head pipe 5. A pair of right and left front forked portions 8 are integrally mounted to the lower end of the steering shaft 7, extending downwardly therefrom. Two link members configured as swinging arms 9 are swingably supported at the lower ends of the front forked portions 8 by means of a pivot arm bolt 11. A front wheel 13 is rotatably supported by the free ends of the swinging arms 9 via a front axle 12.

Figure 6:
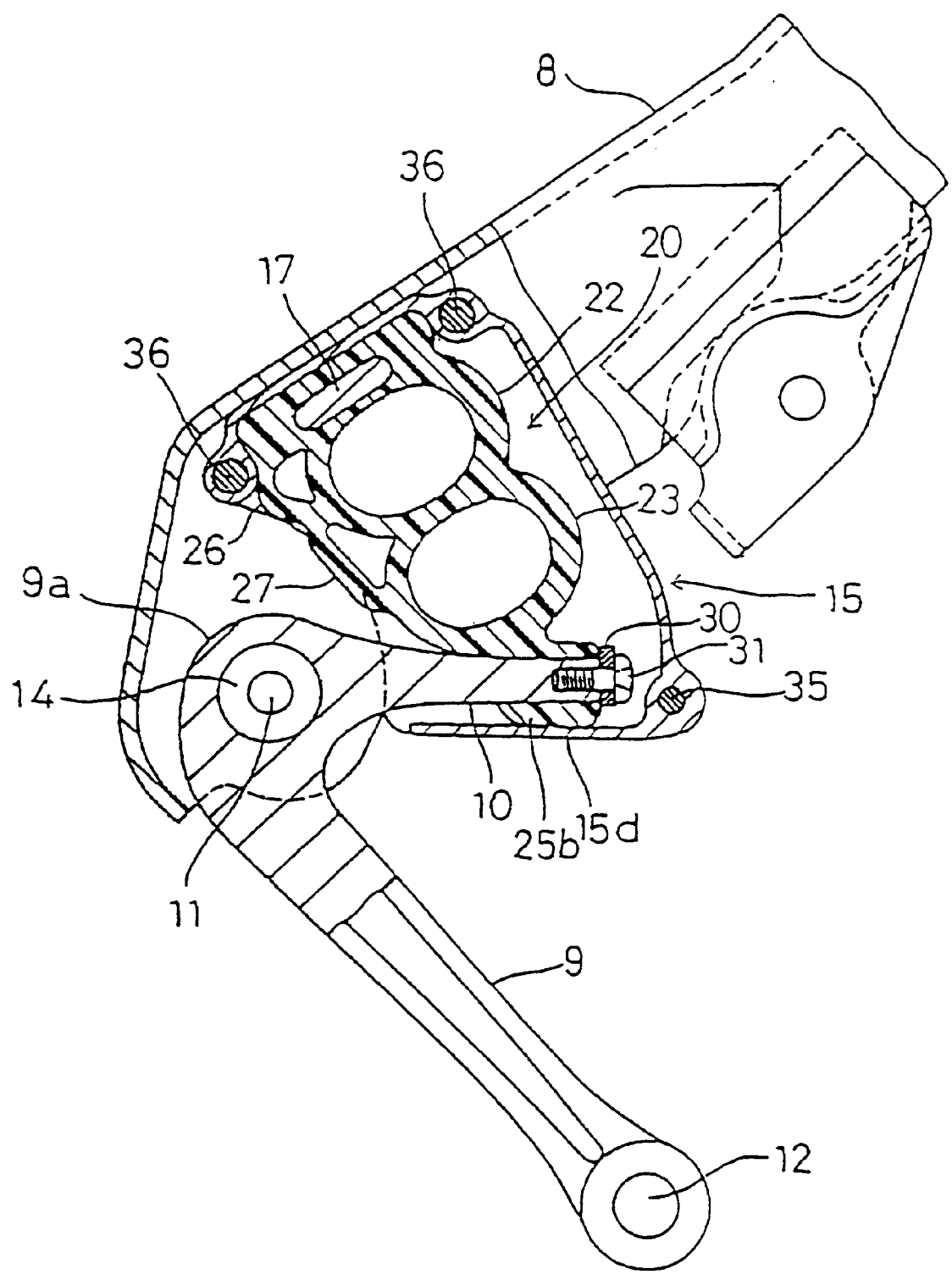
FIG. 6 is a sectional view showing one state of a damping force generating mechanism of a wheel suspension.
Figure 7:
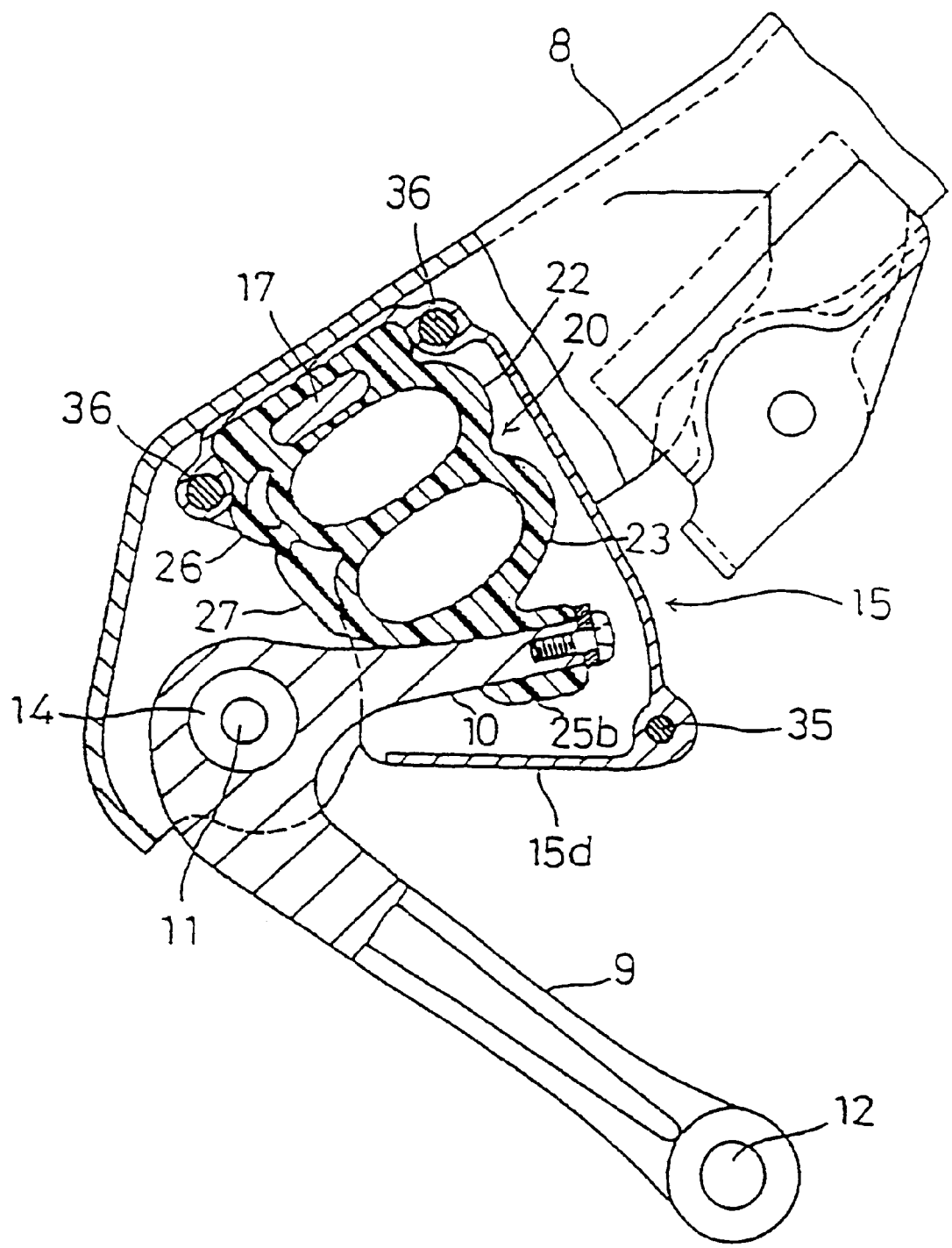
FIG. 7 is a sectional view showing another state of the damping force generating mechanism of FIG. 6.

The front forked portion 8 is formed into a U-shape in cross-section with a front wall and right and left side walls. The lower end portions of both of the side walls include bolt holes. Referring to FIGS. 6 and 7, a base end pivot portion 9a of the swinging arm 9 includes a bushing 14 mounted therein. The base end pivot portion 9a is fitted between both of the side walls of the forked portion 8 in such a manner that the bushing 14 is aligned with the bolt holes formed in the side walls. The pivot arm bolt 11 passes through the bolt holes and the bushing 14 mounted in the base end pivot portion 9a. In this way, the base end pivot portion 9a of the swinging arm 9 is rotatably supported by the pivot arm bolt 11.

The base end pivot portion 9a of the swinging arm 9 is formed into an irregular cylindrical shape with both sides being extended in diameter. A plate-like lever 10 is integrally formed on the outer peripheral surface of the cylinder portion of the base end pivot portion 9a in such a manner as to extend therefrom in the centrifugal direction.

In the case where the swinging arm 9 extends rearward from the base end pivot portion 9a, the lever 10 extends obliquely upward from the swinging arm 9 forming an angle of about 60° therebetween. In this position, the lever 10 extends between the front forked portion 8 and the swinging arm 9.

A fan-shaped case 15 is fixedly fitted in the front forked portion 8 in such a manner as to be adjacent to the upper side of the base end pivot portion 9a of the swinging arm 9 pivotably supported at the lower end of the front forked portion 8.

Figure 3:
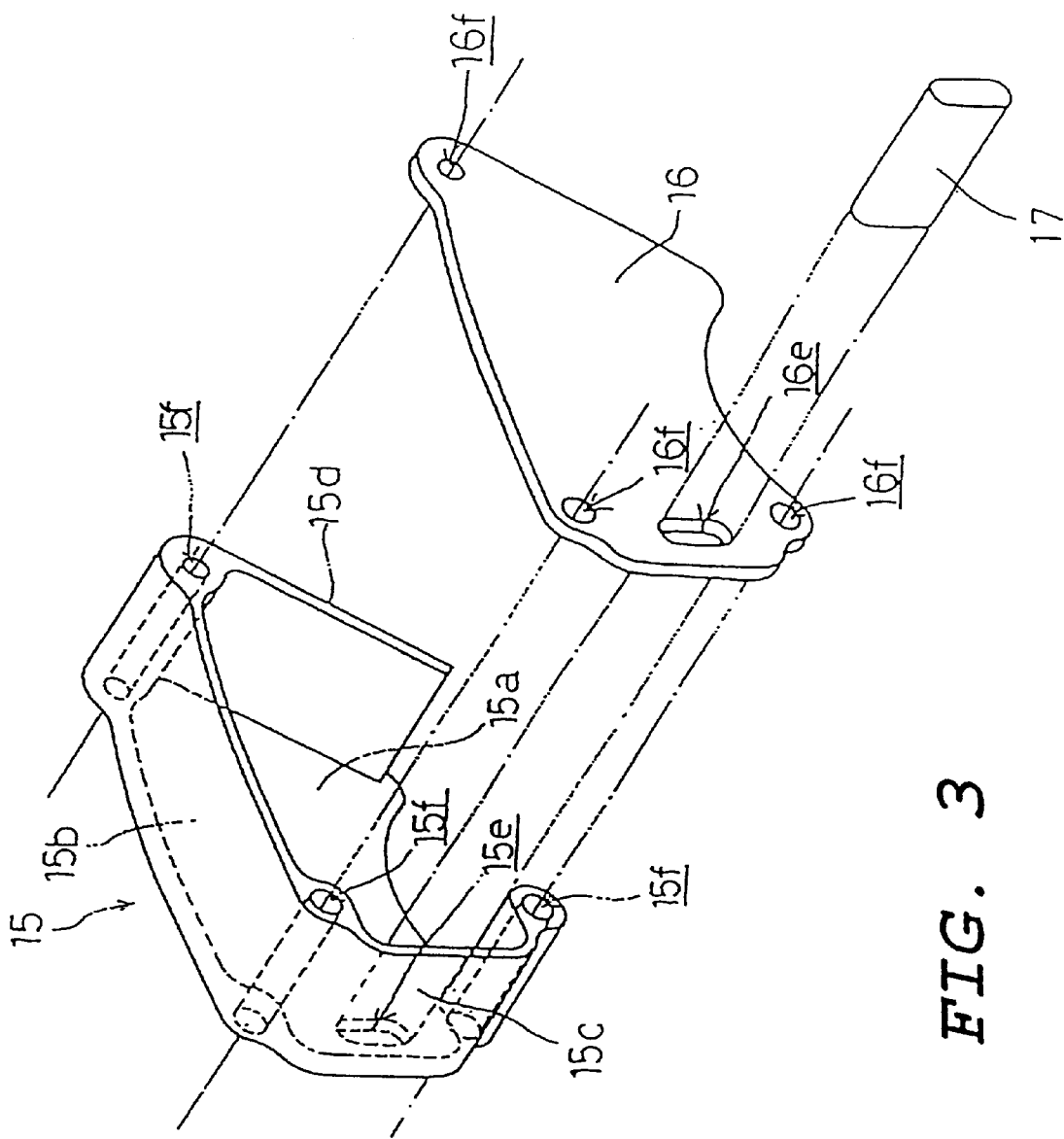
FIG. 3 is an exploded perspective view showing a case, a lid member, and a locking piece.
Figure 4:
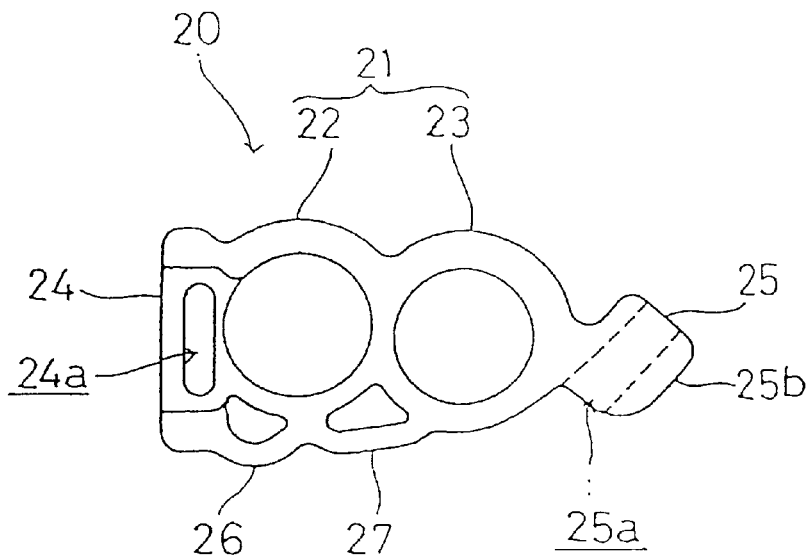
FIG. 4 is a side view of a compression spring according to the present invention.
Figure 5:
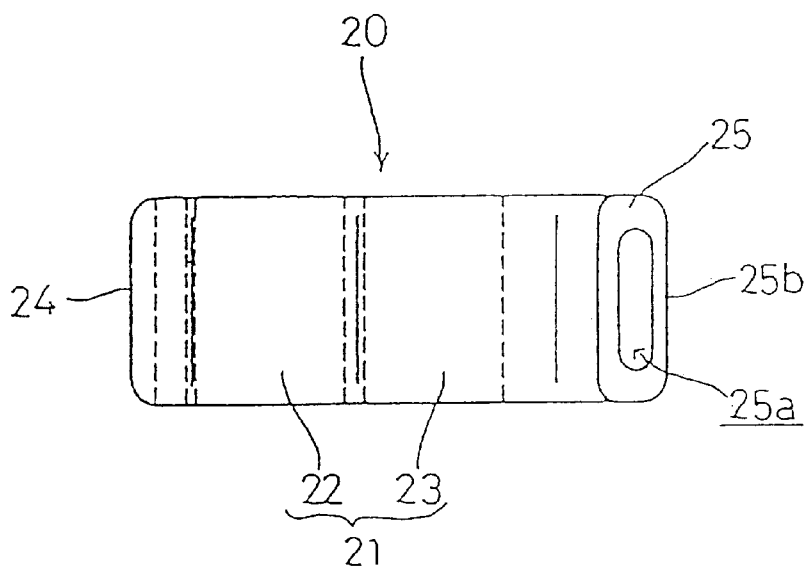
FIG. 5 is a top view of the compression spring of FIG. 4.

As shown in FIG. 3, the case 15 is formed into a box-like shape with a fan-shaped side wall 15a, an outer peripheral wall 15b, and a front wall 15c and a rear wall 15d extending along the radial direction. A slot 15e is formed in the side wall 15a along the front edge portion of the side wall 15a. Three circular holes 15f are respectively formed in upper and lower ends of the front wall 15c and the upper end of the rear wall 15d in such a manner that each circular hole passes through the associated wall from right to left in the width direction.

As shown in FIG. 3, an opening of the case 15, opposite to the side wall 15a, is closed with a plate-like lid member 16. The lid member 16 is formed into the same fan-shape as that of the side wall 15a, and has a slot 16e corresponding to the slot 15e and three circular-holes 16f corresponding to the three circular-holes 15f. A locking piece 17 is engaged with the slots 15e and 16e opposed to each other. When the lid member 16 is assembled with the case 15, only the lower side of the case 15 is open.

A compression spring 20 is made of an elastic body. The compression spring 20 is contained in the case 15, covered with the lid member 16. The body of the compression spring 20 is preferably made from a polyester elastomer material and is formed into a shape illustrated in FIGS. 4 and 5.

Two cylindrical elastic bodies 22 and 23 are stacked in the radial direction to form a spring main body 21. A base 24 which has a flat bottom surface swelled along a plane perpendicular to the pressing direction is formed on the pressing force receiving side of the cylindrical elastic body 22. The base 24 is provided with a slot 24a passing through the base in the width direction. The slot 24a corresponds to the slot 15e of the case 15.

A cylindrical projection 25 is formed on the pressing portion of the cylindrical elastic body 23 in such a manner as to project therefrom at a predetermined angle.

The cylindrical projection 25 is provided with a slot 25a which passes through the cylindrical projection 25 in a direction perpendicular to the width direction.

The swelled portion of the base 24 is integrally connected to a side portion of the cylindrical elastic body 22 via a reinforcing wall 26, and the side portion of the cylindrical elastic body 22 is integrally formed for connecting to a side portion of the cylindrical elastic body 23 via a reinforcing wall 27.

The compression spring 20 having the above configuration is assembled in the case 15 according to the following procedure. First, the lever 10 integrated with the swinging arm 9 is allowed to pass through the slot 25a of the cylindrical projection 25 of the compression spring 20. The compression spring 20 is thus mounted to the lever 10. The compression spring 20 is therefore mounted to the lever 10 in such a manner that the reinforcing walls 26 and 27 are directed toward the base end pivot portion 9a side.

The cylindrical projection 25 of the compression spring 20 is fixed to the lever 10 by fastening a screw 31 to the end surface of the lever 10 via a washer 30 (see FIGS. 6 and 7).

The compression spring 20 is covered with the case 15 to be located in the case 15. The case 15 is then covered with the lid member 16. In this mounting state, the lever 10 is inserted in the case 15 through the lower side opening of the case 15.

The locking piece 17 is fittingly inserted in the slots 15e of the case 15, the slot 24a of the compression spring 20, and the slot 16e of the lid member 16. A screw 35 is screwed in the circular-hole 15f at the upper end of the rear wall 15d of the case 15 and the corresponding circular-hole 16f of the lid member 16, to fix the lid member 16 to the case 15.

The case 15, covered with the lid member 16, which is mounted to the lever 10 via the compression spring 20 is inserted in the recess portion on the rear side of the front forked portion 8 in such a manner that the front wall 15c of the case 15 is brought into contact with the bottom surface of the recess.

Each of the right and left side walls of the front forked portion 8 has two circular-holes at specific upper and lower positions along the front edge portion. The circular-holes 15f of the case 15 and the circular-holes 16f of the lid member 16 are aligned with the above circular-holes of the right and left side walls of the front forked portion 8. Bolts 36 pass through the circular-holes in the side walls of the front forked portion 8 and are tightly screwed with nuts. In this way, the case 15 and lid member 16 are co-fastened to the front forked portion 8 by bolts 36.

After assembly, the compression spring 20 is contained in the case 15 with the reinforcing walls 26 and 27 directed toward the base end pivot portion 9a side as shown in FIG. 6.

The front end portion of the compression spring 20 is positioned by locking with the locking piece 17 through the slots 15e, 16e and 24a. The rear portion of the compression spring 20 is also positioned in such a state that the lever 10 is inserted in the slot 25a of the cylindrical projection 25. Further, the rear portion 25b of the cylindrical projection 25 is in contact with the rear wall 15d of the case 15.

In this way, the compression spring 20 is simply interposed between the front forked portion 8 and the lever 10 when the front portion is locked with the locking piece 17 and the rear portion is locked with the lever 10.

When the front wheel 13 is subjected to shock due to irregularities of the ground or subjected to a load upon braking, the swinging arm 9 is swung. At this time, the swinging arm 9 integrated with the lever 10 is moved from the state shown in FIG. 6 to the state shown in FIG. 7, so that the compression spring 20, which is pressed forwardly toward the front forked portion 8 side by the lever 10, is elastically deformed.

When the spring main body 21 is pressed in the radial direction, the necked connecting portion between the base 24 and the cylindrical elastic body 22 prevents the spring main body 21 from being bent in one direction with the aid of the reinforcing wall 26 provided on the compression spring 20 arranged on the side facing the swinging center of the lever 10. As a result, the spring main body 21 is prevented from being tilted to an unbalanced state.

When the spring main body 21 is pressed in the radial direction, the necked connecting portion between the cylindrical elastic body 22 and the cylindrical elastic body 23 is also prevented from being bent in one direction, particularly, toward the swinging center side, with the aid of the reinforcing wall 27 provided between the side portions of the elastic bodies 22 and 23 arranged on the side facing the swinging center of the lever 10. As a result, the spring main body 21 is prevented from being deformed into bending at its midpoint.

As described above, the compression spring 20 maintains its shape upon elastic deformation and a specific load-deformation characteristic is always maintained without the necessity of any additional supporting member. Furthermore, the compression spring is capable of absorbing compression energy and ensuring a damping force due to stable, elastic deformation of the compression spring 20. The compression spring 20 of the present invention has an increased number of applications and is very versatile since it does not require any supporting member.

Figure 8:
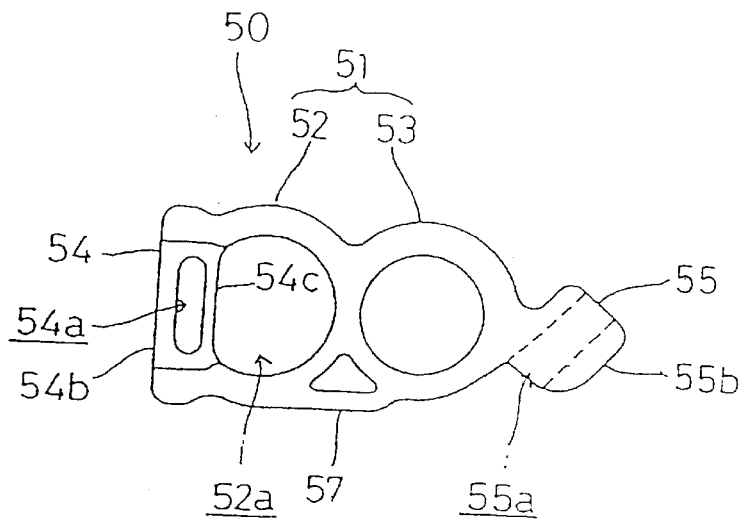
FIG. 8 is a side view of a compression spring according to another embodiment of the present invention.
Figure 9:
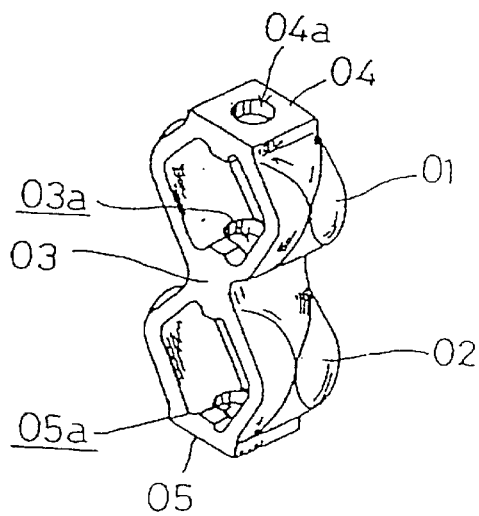
FIG. 9 is a perspective view of a related art compression spring.

A compression spring 50 according to another embodiment of the present invention will now be described with reference to FIG. 8. In the compression spring 50, two cylindrical elastic bodies 52 and 53 are stacked in the radial direction to form a spring main body 51. A base 54, which has a flat bottom surface 54b swelled along a plane perpendicular to the pressing direction, is formed on the pressing force receiving side of the cylindrical elastic body 52. The base 54 has a slot 54a passing through the base 54 in the width direction. The base 54 forms a part of the cylindrical elastic body 52 since a flat upper surface 54c partially intersects the circular hollow 52a of the cylindrical elastic body 52.

A cylindrical projection 55 is formed on the pressing portion of the cylindrical elastic body 53 in such a manner as to project therefrom at a predetermined angle. The cylindrical projection 55 has a slot 55a extending in a direction perpendicular to the width direction. A side portion of the cylindrical elastic body 52 is integrally connected to a side portion of the cylindrical elastic body 53 by means of a reinforcing wall 57.

Since the base 54 forms a part of the cylindrical elastic body 52 in the state that the flat upper surface 54c partially intersects the circular hollow 52a of the cylindrical elastic body 52, the side portions of the cylindrical elastic body 52, serving as leg portions, are connected to the flat plate like base 54. As a result, the connecting portion between the cylindrical elastic body 52 and the base 54 does not include a necked portion.

Accordingly, when the compression spring 50 is pressed in the radial direction, the cylindrical elastic body 52, and therefore the spring main body 51 is prevented from being tilted to an unbalanced state.

When the spring main body 51 is pressed in the radial direction, the necked connecting portion between the cylindrical elastic body 52 and the cylindrical elastic body 53 is also prevented from being bent in one direction, particularly, toward the swinging center side, with the aid of the reinforcing wall 57 provided between both side portions of the elastic bodies 52 and 53 arranged on the side facing toward the swinging center of the lever 10. As a result, the spring main body 51 is prevented from being deformed to bend at its midpoint.

As described above, the compression spring 50 is capable of stabilizing its shape upon elastic deformation and a specific load-deformation characteristic is obtained without the necessity of any additional supporting member. Furthermore, a compression energy is absorbed, ensuring a damping force by the stable, elastic deformation of the compression spring 50. The compression spring 50 has an increased number of applications and is very versatile, since it does not require any supporting member.

While the compression spring is made from a polyester elastomer in the above embodiments, it may be made from a material selected from other resins and rubbers.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A compression spring comprising:
   a cylindrical spring main body for absorbing compression energy when said compression spring is pressed in a radial direction by elastic deformation of said cylindrical spring main body;
   a base having a flat bottom surface swelled along a plane perpendicular to the pressing direction, said base is formed on a side receiving a pressing force from said spring main body; and
   a reinforcing wall for connecting the swelled portion of said base to a side portion of said cylindrical spring main body, said reinforcing wall is formed integrally with said spring main body on only one side of said spring main body.

2. The compression spring according to claim 1, wherein said spring main body is formed of an elastic material.

3. The compression spring according to claim 1, wherein said cylindrical spring main body includes a plurality of cylindrical elastic bodies stacked in the radial direction.

4. The compression spring according to claim 3, further comprising at least one reinforcing wall for connecting adjacent side portions of said plurality of cylindrical elastic bodies to each other, said at least one reinforcing wall is formed integrally with said spring main body on only one side of said spring main body.

5. The compression spring according to claim 4, further comprising a cylindrical projection formed on a side of said plurality of cylindrical elastic bodies opposite said base, said cylindrical projection includes an aperture extending therethrough.

6. The compression spring according to claim 5, wherein said plurality of cylindrical elastic bodies each includes a hollow portion extending therethrough and said base includes a slot extending therethrough.

7. A compression spring comprising:
   a cylindrical spring main body for absorbing compression energy when said compression spring is pressed in a radial direction by elastic deformation of said cylindrical spring main body;
   said cylindrical spring main body includes a plurality of cylindrical elastic bodies stacked in the radial direction; and
   at least one reinforcing wall for connecting adjacent side portions of said plurality of cylindrical elastic bodies to each other, said at least one reinforcing wall is formed integrally with said spring main body on only one side of said spring main body.

8. The compression spring according to claim 7, wherein said spring main body is formed of an elastic material.

9. The compression spring according to claim 8, further comprising a base having a flat bottom surface swelled along a plane perpendicular to the pressing direction, said base is formed on a side receiving a pressing force from said spring main body.

10. The compression spring according to claim 9, further comprising a reinforcing wall for connecting the swelled portion of said base to a side portion of said cylindrical spring main body, said reinforcing wall is formed integrally with said spring main body on only one side of said spring main body.

11. The compression spring according to claim 10, further comprising a cylindrical projection formed on a side of said plurality of cylindrical elastic bodies opposite said base, said cylindrical projection includes an aperture extending therethrough.

12. The compression spring according to claim 11, wherein said plurality of cylindrical elastic bodies each includes a hollow portion extending therethrough and said base includes a slot extending therethrough.

13. A compression spring comprising:
   a cylindrical spring main body for absorbing compression energy when said compression spring is pressed in a radial direction by elastic deformation of said cylindrical spring main body, said cylindrical spring main body including a circular hollow portion;
   a base having a flat bottom surface swelled along a plane perpendicular to the pressing direction, said base is formed on a side receiving a pressing force from said spring main body;
   a flat upper surface of said base partially intersects the circular hollow portion of said cylindrical spring main body; and
   at least one reinforcing wall formed on only one side of said spring main body, said reinforcing wall being formed integrally with said spring main body.

14. The compression spring according to claim 13, wherein said spring is formed of an elastic material.

15. The compression spring according to claim 13, wherein said cylindrical spring main body includes a plurality of cylindrical elastic bodies stacked in the radial direction.

16. The compression spring according to claim 15, wherein said at least one reinforcing wall connects adjacent side portions of said plurality of cylindrical elastic bodies to each other.

17. The compression spring according to claim 16, further comprising a cylindrical projection formed on a side of said plurality of cylindrical elastic bodies opposite said base, said cylindrical projection includes an aperture extending therethrough.

18. The compression spring according to claim 17, wherein said plurality of cylindrical elastic bodies each includes a hollow portion extending therethrough and said base includes a slot extending therethrough.

19. The compression spring according to claim 15, wherein said at least one reinforcing wall connects the swelled portion of said base to a side portion of one of said plurality of cylindrical elastic bodies.

* * * * *